Figure 1:
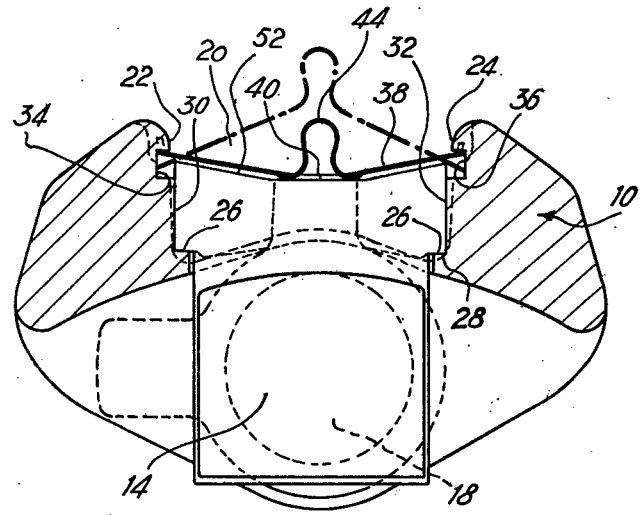

United States Patent [19]  [11] 3,880,261
Courbot  [45] Apr. 29, 1975

[54] DISC BRAKE
[75] Inventor: Pierre Courbot, Villiers-le-Bel, France
[73] Assignee: Societe Anonyme D.B.A., Paris, France
[22] Filed: Mar. 27, 1974
[21] Appl. No.: 455,100

[30] Foreign Application Priority Data
Apr. 19, 1973  France .............................. 73.14283

[52] U.S. Cl. ............ 188/73.5; 188/73.6; 188/205 A
[51] Int. Cl. ............................................. F16d 65/02
[58] Field of Search .... 188/73.3, 73.5, 73.6, 250 G, 188/250 E, 23 A, 205 A

[56] References Cited
UNITED STATES PATENTS
| 3,387,687 | 6/1968 | Eggstein et al. | 188/73.3 |
| 3,625,316 | 12/1971 | Mori | 188/73.5 |
| 3,677,373 | 7/1972 | Lucien | 188/73.3 |

FOREIGN PATENTS OR APPLICATIONS
| 41-36695 | 1/1966 | Japan | 188/73.6 |
| 1,212,427 | 11/1970 | United Kingdom | 188/73.6 |

Primary Examiner—Trygve M. Blix
Assistant Examiner—Edward Kazenske
Attorney, Agent, or Firm—Ken C. Decker; William N. Antonia

[57] ABSTRACT

The ends of a metal sheet forming antirattle spring are engaged in two opposite axial grooves formed in the axial edges of an aperture in a torque taking member in such a way that it can occupy two stable positions, the first stable position being convex and nearer the exterior of the brake during mounting of the spring, and the second stable position being concave and nearer the interior of the brake to urge at least one pad anchored on the axial edges of the aperture onto a stop preventing radial escape of the pad towards the interior of the brake. The upper edge of the pad is concave and formed with an intermediate surface on which the spring is bearing and with two extensions adjacent the ends of the spring which apply a shearing force to the spring when the radial travel of the pad reaches a predetermined value, thus avoiding the spring to move into its first stable position.

6 Claims, 2 Drawing Figures

DISC BRAKE

The invention relates to a disc brake and to a friction pad for such a brake.

More particularly, the invention relates to a disc brake comprising a torque taking member in which is anchored at least one pad capable of being extracted radially outwards from the brake through an aperture in the torque taking member, stop means preventing radial escape of the pad towards the interior of the brake, and tightening means adapted to urge the pad against the adjacent face of the disc, the aperture in the torque taking member being formed with two axial edges on which is bearing a spring urging the pad resiliently onto the stop means.

Such a brake, in which the tightening means can include actuators on each side of the disc, the torque taking member being a fixed caliper, or on one side of the disc, the torque taking member being a fixed support or a slidable caliper, requires the use of an antirattle spring which should urge at least one of the pads towards the stop means and permit to absorb the rattle of the pad without permitting the radial escape of the pad towards the exterior of the brake during the actuation of the actuators.

These effects are generally performed by the provision of antirattle springs which are forced into position and fairly difficult to remove. Furthermore, removable members are often associated to the torque taking member to avoid the radial escape of the pads towards the exterior of the brake. These characteristics reduce the usefulness of radial extraction of the pads, which is the advantage of disc brakes of the above mentioned type.

To overcome these disadvantages, the invention proposes a disc brake of the above mentioned type, in which the spring is formed with two opposite ends, each of the axial edges of the aperture including an axial groove, each end of the spring being engaged in one of said grooves, the distance between the ends of the spring before its engagement being greater than the distance between the bottoms of the grooves so that, while thus compressed, the spring can occupy two stable positions, the first stable position being convex and nearer the exterior of the brake during mounting of the spring, and the second stable position being concave and nearer the interior of the brake to urge the pad onto the stop means.

According to another feature of the invention, the spring, when in its second stable position, urges the pads onto the stop means by way of one of the pad edges which comprises two circumferentially spaced extensions capable of abutting near the ends of the spring when the radial travel of the pad towards the exterior of the brake reaches a predetermined value, thus preventing the spring from moving into the first stable position.

Preferentially, the spring is made of a resilient metal sheet and comprises at least one loop-like portion directed radially out of the brake to permit its extraction.

The invention also relates to a friction pad for a disc brake of the type including a support plate carrying a brake lining adapted to engage a rotary disc, the support plate comprising a first and a second edges opposite to each other and interconnected by two anchoring edges, abutting surfaces being provided at least on one of said second and anchoring edges to avoid radial escape of the pad towards the center of the disc, each of said anchoring edges being formed with an anchoring surface adapted to engage a torque taking surface provided in the disc brake.

According to the invention, such a pad is characterized in that the first edge of the support plate is generally V-shaped to form one extension adjacent each of said anchoring edges, the middle part of the first edge comprising an intermediate surface approximately parallel to the plane joining the ends of this last-mentioned edge, said plane being approximately perpendicular to a radius of the disc.

A friction pad with such a design can be used in a disc brake of the above mentioned type to prevent the antirattle spring from moving into the first stable position, thereby avoiding unexpected radial extraction of the pads outwards from the brake.

According to another feature of the invention, the extensions on the first edge of the friction pad are formed by two flat surfaces inclined with respect to the plane joining the ends of the first edge and interconnected by the intermediate surface to form a concave first edge.

Figure 2:
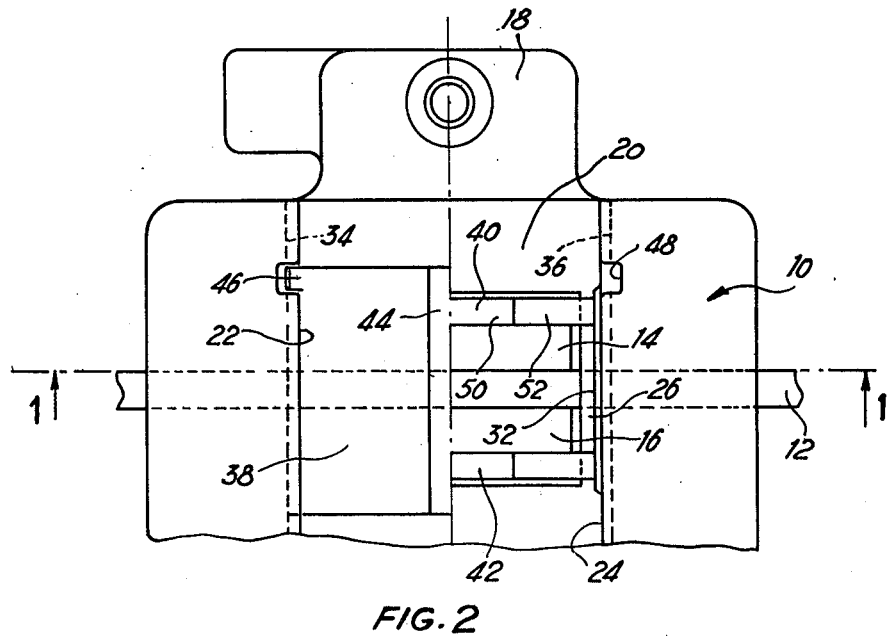

A disc brake embodying the invention will now be described by way of example, with reference to the accompanying drawings in which:

FIG. 1 is a partial cross-section through a disc brake embodying the invention; and FIG. 2 is a plan view of the brake shown in FIG. 1, half of the spring having been removed.

In the disc brake illustrated in the drawings, a torque taking member generally designated 10 forms a caliper which straddles the disc 12 and in which are anchored two friction pads 14 and 16, tightening means 18 being adapted to apply pads 14, 16 to the corresponding faces of the disc 12. These tightening means are a fluid pressure-operated brake actuator 18, to operate the pad 14, and either a second brake actuator (not shown) if the torque taking member is a fixed caliper or a reaction element of the caliper if the torque taking member is a caliper axially slidable on a fixed support (not shown), to operate the pad 16.

That portion of the caliper 10 straddling the disc contains an aperture 20 so that the pads can be extracted radially. The axial edges 22, 24 of the aperture 20 bear projections forming stop means 26, on which corresponding projecting portions 28 on the anchoring edges of the pads 14 and 16 are supported, to prevent the pads from escaping radially inwards into the brake. During braking the pads become anchored by two anchoring surfaces against two surfaces 30, 32 on the edges 22, 24 respectively of the aperture 20.

Axial grooves 34, 36 are provided in the edges 22 and 24 respectively. A metal sheet forming an antirattle spring 38 bears by its ends on the bottoms of the grooves so as to urge the pads 14, 16 on to the caliper projections 26 by way of their upper edges 40, 42 respectively interconnecting the anchoring edges. Note that the distance between the axial ends of the spring 38 is greater than the distance between the bottoms of the axial grooves 34 and 36, with the result that the spring 38 is compressed circumferentially and can occupy two stable equilibrium positions. The first of these positions, shown by chain lines in FIG. 1, is the mounting position, whereas the second, shown by solid lines, is the position corresponding to brake operation. The spring 38 has an axial loop 44 in the immediate vicinity of the axial plane passing through the centres of the friction surfaces on the pads 14, 16 so that the spring can be removed rapidly by pulling its loop to bring the spring into its first equilibrium position.

Two lugs 46 which enter corresponding slots 48 in the edges 22, 24 of the aperture 20 lock the spring 38 in position axially relative to the caliper 10. The upper edges 40, 42 of the pads are concave and comprise a straight circumferential intermediate surface 50, extended on each side by a surface 52 which is approximately parallel to the adjacent leg of the spring 38 when the latter has been mounted and is applying the pads to the projections 26 by the intermediate surface 50. Jolting during application of the brake might tend to shift the pads out of position and make them move the spring into its first equilibrium position. The shape of the pads used in this embodiment removes this risk because the surfaces 52 form two radial extensions which are adjacent the ends of the spring, embedded in the slots 34, 36, so that they apply a shearing force when the radial travel of the pads reaches a predetermined value corresponding to the initial radial distance between the projections and the spring. The noise-reducing spring 38 then acts as a stop, preventing the pads from escaping radially outwards from the brake.

As a result of the invention the replacement of the pads is a very simple operation. The loop 44 is merely pulled to bring the spring into the equilibrium position shown by chain lines in FIG. 1. The spring is removed, and the pads are extracted by sliding them radially through the aperture 20. New pads are inserted through the aperture 20. One end of the spring is introduced into one of the axial grooves 34 or 36, and abuts on the adjacent surface 52 on each pad or on the inner edge of the groove. The other end of the spring is then inserted in the other groove 34 or 36, so that the spring is in the position shown by chain lines in FIG. 1. Each end of the spring is now abutting on the corresponding surface 52 or on the inner edge of the associated groove, and all that remains is to press down the loop-forming portion 44 so that the spring is in its second position and rests on the surfaces 50 of the pads. The brake is now ready to operate.

In an other embodiment of the disc brake and of the pads according to the invention (not shown), the caliper is axially slidable on a fixed support forming torque taking member for at least one pad, an aperture similar to aperture 20 being formed in the fixed support and adapted to slidably carry pads similar to pads 14 and 16 and an antirattle spring similar to spring 38.

It should be noticed that a spring similar to spring 38 can be used for each pad or for only one pad without departing from the spirit of the invention.

I claim:

1. In a disc brake:
a disc mounted for rotation with a member to be braked;
a torque taking member mounted adjacent one side of said disc, said torque taking member defining an aperture therein defined by a pair of inner edges of said torque member;
a friction element disposed between said inner edges of said torque member and adapted to anchor thereon when a brake application is effected, said friction element being removable from said torque member through said aperture radially outwardly with respect to said disc;
abutment means on said inner edges of the torque member and on the corresponding edges of said friction element to locate the latter radially with respect to the torque member;
actuating means for urging said friction element into braking engagement with said disc when a brake application is effected; and
retention means for retaining said friction element on said torque member, said retention means including a pair of facing recesses on said inner edges, and a substantially rectilinear spring, the length of the spring being greater than the length between the bottoms of said recesses so that when the opposite ends of the rectilinear spring are installed in said recesses the spring is movable between first and second stable positions;
a first portion of said spring engaging the upper edge of said friction element when the spring is in said first stable position to urge the abutment means on the friction element and the torque member into engagement, said spring in said second position being substantially symmetrical about a plane passing through said recesses with respect to the first position to permit removal of the spring from the torque member.

2. A disc brake as recited in claim 1, wherein the upper edge of said friction element includes a pair of spaced-apart surfaces adapted to engage corresponding portions of said spring adjacent the opposite ends thereof when the friction element moves radially outwardly toward said spring for a predetermined distance, said predetermined distance being less than the radial travel of said spring required to move the latter to said second stable position.

3. The invention of claim 2, wherein said upper edge of said friction element defines a substantially concave surface, the opposite ends of said concave surface defining said surfaces adapted to engage said corresponding portions of said spring.

4. The invention of claim 3, wherein said upper edge of said friction element includes a substantially flat intermediate surface, said spaced-apart surfaces extending from opposite ends of said intermediate surface and projecting toward said aperture, said first portion of said spring engaging said intermediate surface.

5. The invention of claim 1, wherein said spring includes at least one looped portion adjacent said first portion and projecting toward said aperture.

6. The invention of claim 1, wherein said torque member includes a slot extending radially with respect to said torque member and said spring includes a lug extending into said slot to lock said spring from movement axially with respect to said torque member.

* * * * *